United States Patent
Martin (10) Patent No.: US 11,235,975 B2
(45) Date of Patent: Feb. 1, 2022

(54) STABILIZED SODIUM CHLORITE SOLUTION AND A METHOD OF REMEDIATING AN AQUEOUS SYSTEM USING THE SOLUTION

(71) Applicant: Roy W. Martin, Downers Grove, IL (US)

(72) Inventor: Roy W. Martin, Downers Grove, IL (US)

(73) Assignee: TRUDX, INC., Alpine, WY (US)

( * ) Notice: Subject to any disclaimer, the term of this patent is extended or adjusted under 35 U.S.C. 154(b) by 113 days.

(21) Appl. No.: 16/864,407

(22) Filed: May 1, 2020

(65) Prior Publication Data

US 2020/0354218 A1    Nov. 12, 2020

Related U.S. Application Data

(60) Provisional application No. 62/920,571, filed on May 6, 2019.

(51) Int. Cl.
*C01B 11/02* (2006.01)
*C02F 1/50* (2006.01)

(52) U.S. Cl.
CPC .............. *C01B 11/024* (2013.01); *C02F 1/50* (2013.01); *C02F 2303/04* (2013.01)

(58) Field of Classification Search
CPC ............................. C01B 11/024; A01N 59/00
USPC ........... 210/754; 424/661; 8/108.1; 252/175, 252/187.2; 510/116
See application file for complete search history.

(56) References Cited

U.S. PATENT DOCUMENTS

| | | | |
|---|---|---|---|
| 2,977,314 A * | 3/1961 | Stephanou | D06L 4/23 252/186.21 |
| 4,044,103 A | 8/1977 | Mollard | |
| 6,824,756 B2 | 11/2004 | Rosenblatt | |
| 6,855,294 B2 | 2/2005 | Taylor | |
| 7,311,884 B2 | 12/2007 | Brownfield | |
| 7,407,641 B2 | 8/2008 | Cowley | |
| 7,465,412 B2 | 12/2008 | Pickens | |
| 7,504,074 B2 | 3/2009 | Martens | |
| 7,754,057 B2 | 7/2010 | O-Leary | |
| 7,833,392 B2 | 11/2010 | Nanjundiah | |
| 7,922,933 B2 | 4/2011 | Martin | |
| 7,927,509 B2 * | 4/2011 | Martin | C01B 11/024 252/187.21 |
| 7,964,138 B2 | 7/2011 | Richrdson | |
| 7,976,725 B2 | 7/2011 | Martin | |
| 8,088,300 B2 | 1/2012 | Byrne | |
| 8,211,296 B2 | 7/2012 | Angelilli | |
| 9,175,208 B2 | 11/2015 | Thompson | |
| 9,521,841 B2 | 12/2016 | Goda | |
| 9,656,891 B2 * | 5/2017 | Martin | C09K 8/605 |
| 9,675,065 B2 * | 6/2017 | Martin | A01N 37/02 |

(Continued)

FOREIGN PATENT DOCUMENTS

WO    WO-0223993 A2 *   3/2002   ............. A01N 59/00

*Primary Examiner* — Nina Bhat (57) ABSTRACT

A stable aqueous composition of sodium chlorite and a hydrated borate donor having a pH of greater than 9.0 and the weight percent ratio of sodium chlorite (reported as $NaClO_2$) to hydrated borate donor (reported as the sum of $H_2O+B_2O_3$) is less than 1.5:1 respectfully. A method of remediating an aqueous system using the stable aqueous composition.

36 Claims, 7 Drawing Sheets

(56) References Cited

U.S. PATENT DOCUMENTS

| | | | |
|---|---|---|---|
| 10,427,959 B2* | 10/2019 | Martin | C09K 8/605 |
| 2010/0183693 A1* | 7/2010 | Martin | A01N 37/42 |
| | | | 424/408 |
| 2010/0272860 A1* | 10/2010 | Martin | A01N 37/42 |
| | | | 426/66 |
| 2010/0323009 A1* | 12/2010 | Martin | A01N 37/42 |
| | | | 424/465 |
| 2020/0308024 A1* | 10/2020 | Martin | C02F 1/76 |

* cited by examiner

Absorption spectra of Avobenzone taken before (straight line) and after increasing doses of UVA

Fig 7

STABILIZED SODIUM CHLORITE SOLUTION AND A METHOD OF REMEDIATING AN AQUEOUS SYSTEM USING THE SOLUTION

FIELD OF THE INVENTION

The invention relates to a stabilized sodium chlorite solution and a method of using the stabilized sodium chlorite solution to remediate an aqueous system.

BACKGROUND OF THE INVENTION

Sodium chlorite is used in many industries for the generation of chlorine dioxide. Chlorine dioxide is favored over many oxidizing biocides due to its biocide efficacy over a broad pH range, low use rate, bio-film penetration and high selectivity in polluted water.

Sodium chlorite solutions are convenient for the on-site generation of chlorine dioxide. However, its use does come with potential hazards. During chemical application or transfer, there is always potential risk of leaks or spills. If liquid sodium chlorite is allowed to dry (crystallize) in the presence of organic compounds (e.g. chemicals, cellulose, wood etc.) spontaneous combustion is almost certain. Furthermore, as long as sodium chlorite maintains a high pH (i.e. pH>9) it will not release chlorine dioxide gas. However, if residual chemicals from cleaners are on the spilled surface, the alkaline pH of the sodium chlorite solution can be compromised resulting in chlorine dioxide generation.

With the broad range of applications as a biocide, expanding the application of chlorine dioxide is highly desirable. However, exposing personnel with little to no training to potentially hazardous sodium chlorite solutions would almost certainly lead to catastrophic events.

Furthermore, if an aqueous solution of sodium chlorite can be made stable in the presence of organic compounds, new compositions can be formulated further expanding its utility. The new compositions must be stable even if dried so that deflagration of the dried compound will not occur.

There is a need to produce a stable sodium chlorite composition that would effectively mitigate the potential for reactions with organic compounds resulting in decomposition or combustion when dried. Furthermore, with this capability organic compounds can be blended into formulations comprising the stabilized sodium chlorite and/or the stabilized sodium chlorite can be applied to organics (i.e. spilled) without concern of inducing spontaneous combustion when dried.

U.S. Pat. No. 4,044,103 discloses a sodium chlorite made stable under storage conditions by (1) admixing with the sodium chlorite a stabilizing salt chemically inert to sodium chlorite and having at least one hydrate whose melting point is higher than about 50° C., in amount such that said stabilizing salt can capture a quantity of water equal to at least about 5% of the weight of the sodium chlorite (NaClO$_2$), the weight of the water in the total mixture being at least about 5% of the weight of said sodium chlorite and (2) drying the mixture sufficiently to reduce the water not captured by the stabilizing salt to an amount equal approximately to zero. Sodium chlorite thus stabilized is thermally stable and does not congeal into a solid mass even when stored in drums for several months at 50° C.

U.S. Pat. No. 6,824,756 discloses a method for producing stable sodium chlorite by pelletization of granular sodium chlorite with metal salt or salts forming hydrates with water of hydration in the pellets being more than 5% of the anhydrous weight of the sodium chlorite. Pelletized sodium chlorite can be used to produce chlorine dioxide gas by passing a dilute mixture of chlorine gas and an inert gas through a bed of the pellets.

U.S. Pat. No. 7,465,412 discloses a composition comprising an admixture of particulate calcium hypochlorite and particulate metaboric acid. The calcium hypochlorite is present in the composition in an amount and is of a concentration such that the composition would be classified as a Packing Group II Division 5.1 oxidizer in the absence of said particulate metaboric acid. Other embodiments described are solid shaped articles, e.g., tablets, comprising the described calcium hypochlorite-metaboric acid composition.

U.S. Pat. No. 8,088,300 discloses a chlorine dioxide generating composition that includes a hydrated solid endothermic agent comprising a hydrated chloride salt.

U.S. Pat. Nos. 7,922,933, 7,927,509, and 7,976,725 which are herein incorporated by reference in their entirety, disclose a cyclic process for the in-situ generation of chlorine dioxide. The cyclic process utilizes bromide ions that are activated by an oxidant to produce free bromine. The free bromine oxidizes chlorite ions producing chlorine dioxide. Chlorine dioxide inactivates microbiological organisms (i.e. *Cryptosporidium*). During this process the free bromine and at least some portion of the chlorine dioxide are reduced back to bromide ions and chlorite ions respectively which are recycled back to free bromine and chlorine dioxide utilizing the cyclic process.

U.S. application Ser. No. 16/501,355 and U.S. application Ser. No. 16/501,567 which are herein incorporated by reference in its entirety, discloses methods for in-situ generation and stabilization of chlorine dioxide in the water of an aquatic facility using UV activation of chlorite ions.

U.S. Pat. Nos. 9,656,891 and 10,427,959 disclose generators for the ex-situ generation of chlorine dioxide.

In accordance with regulations of the US Department of Transportation, 49 CFR § 173.127(a), an "oxidizer" (Division 5.1) is defined as a material that may, generally by yielding oxygen, cause or enhance the combustion of other materials. Sodium chlorite in its crystalline form is classified as a Packing Group I oxidizer. OxyChem based out of Dallas, Tex. is a manufacturer of sodium chlorite. In the OxyChem bulletin titled "Sodium Chlorite Health & Safety" (600-115 Sodium Chlorite 01/2015), it is stated: "Sodium chlorite in its dry form is a strong oxidizer. An oxidizer is a compound that initiates or promotes combustion in other materials. This means that if sodium chlorite comes into contact with combustible materials, it can react rapidly and ignite. However, sodium chlorite will not normally burn by itself. Examples of combustible materials are oil or grease (such as from a forklift), wood (such as pallets), leather, cloth, paints, organics, and in some cases dirt. It is important to keep these materials away from dry sodium chlorite."

Sodium chlorite consumes 7-electrons when it undergoes reduction compared to 2-electrons from other oxy-halo compounds such as calcium hypochlorite. This along with other factors attribute to its ability to initiate spontaneous combustion and rapidly propagate combustion when the crystallized form of sodium chlorite is in contact with a fuel source exemplified by cotton and cellulose.

Sodium chlorite compositions utilize alkali such as sodium hydroxide to stabilize the chlorite. However, the amount of alkali is sufficient to elevate the pH to greater than or equal to 11.0. In the event the sodium chlorite contacts chemicals or residue that neutralizes the excess hydroxide alkalinity, the sodium chlorite is destabilized and chlorine dioxide generation can result.

Heterotrophic plate count (HPC) is also known by a number of other names, including standard plate count, total plate count, total viable count or aerobic quality count. It does not differentiate between the types of bacteria present nor does it indicate the total number of bacteria present in the water—only those capable of forming visible colonies under specified conditions on certain non-selective microbiological media. Varying the incubation temperature will favor the growth of different groups of bacteria. As it gives more meaningful information about pathogenic (disease-causing) bacteria, 35° C. (or 37° C.) is the preferred incubation temperature.

Results reported by the laboratory are traditionally expressed as colony forming units per milliliter (CFU/mL) which equates to the number of bacteria in each milliliter of the original sample of water. A HPC count of less than1 CFU/mL indicates that the disinfection system is effective. If the count is between 10 and 100 CFU/mL, a routine investigation should be conducted as soon as possible to ensure that all the management operations are functioning properly.

SUMMARY OF THE INVENTION

The problems with conventional sodium chlorite compositions discussed above can be overcome by using the present stabile sodium chlorite solution.

An objective of the present invention is to provide a stable chlorite solution that avoids the hazardous problems with conventional chlorite solutions, including not spontaneously igniting when dry.

The objectives of the invention and other objectives can be obtained by a composition formed from water, sodium chlorite, and a hydrated borate donor, wherein the composition having a pH of greater than 9.0 and the weight percent ratio of sodium chlorite (reported as $NaClO_2$) to hydrated borate donor (reported as the sum of $H_2O+B_2O_3$) is less than 1.5:1

The objectives can also be obtained by a first method for the remediation of an aqueous system comprising:

converting an aqueous solution into an aqueous solution of chlorine dioxide using a chlorine dioxide generator, wherein the composition is formed from water, sodium chlorite and a hydrated borate donor, the composition having a pH of greater than 9.0 and the weight percent ratio of sodium chlorite (reported as $NaClO_2$) to hydrated borate donor (reported as the sum of $H_2O+B_2O_3$) is less than 1.5:1 respectfully;

applying the aqueous solution of chlorine dioxide to the aqueous system; and sustaining a chlorine dioxide concentration to obtain a Ct value sufficient to achieve remediation. The first method can further comprise sustaining the chlorine dioxide concentration using a cyclic process or using UV activation of chlorite.

The objectives can also be obtained by a second method for the remediation of an aqueous system comprising:

applying a composition to the aqueous system, wherein the composition is formed from water, sodium chlorite and a hydrated borate donor, the composition having a pH of greater than 9.0 and the weight percent ratio of sodium chlorite (reported as $NaClO_2$) to hydrated borate donor (reported as the sum of $H_2O+B_2O_3$) is less than 1.5:1 respectfully;

converting the chlorite into chlorine dioxide using the cyclic process and/or UV activation of chlorite; and sustaining a chlorine dioxide concentration to obtain a Ct value sufficient to achieve remediation.

Preferably, the weight percent ratio of $NaClO_2$ to hydrated borate donor is less than or equal to 1.25:1, and more preferably less than or equal to 1:1.

The pH is preferably greater than 10.0, and more preferably greater than 11.0.

Preferably, the composition further comprises a UV absorbent.

The aqueous system can comprise a cooling system. The aqueous system can comprise recreational water.

Preferably, the composition in dried form meets the classified as non-divisional 5.1.

DETAILED DESCRIPTION OF THE INVENTION

The stabilized sodium chlorite solution comprises a chlorite donor (sodium chlorite), a borate donor and optionally a UV absorbent. I have found that oxidizers like sodium chlorite can now be safely combined with organic compounds like UV absorbents when an effective amount of borate donor is incorporated into the composition without concern of deflagration or detonation resulting from decomposition of the chlorite, which was surprising and unexpected.

The stabilized aqueous sodium chlorite composition can be formed by combining water, sodium chlorite and a hydrated borate donor to achieve a desired ratio of chlorite (as $NaClO_2$) to hydrated borate donor (reported as the sum of $H_2O+B_2O_3$). The sodium chlorite and hydrated borate donor can be in solid or aqueous liquid forms prior to forming the composition. The UV absorbent can be added before or after the chlorite donor blending with the aqueous solution of hydrated borate donor.

It is desirable to apply UV absorbent in sufficient concentration to inhibit the UV decomposition of the chlorine dioxide in order to achieve the desired treatment effect. The level of UV inhibition depends on the concentration of chlorite donor being applied, the intensity of the UV radiation and the like.

Typically the UV absorbent is applied to the aqueous system to achieve from 0.005 to 10 ppm, more preferred 0.01 to 6 ppm and most preferred 0.02 to 4 ppm.

UV absorbents comprise organic chromophores that absorb various wavelengths of light in the UV spectrum. Common examples of UV absorbents are sunscreens and optical brighteners used in laundry treatments to improve whitening of fabrics. The range of UV absorbance can vary significantly from compound to compound. Furthermore, the solubility of the compound, stability to oxidizers (e.g. chlorine and chlorine dioxide) as well as UV degradation varies from compound to compound. The selection of the UV absorbents can be altered and blended to take advantage of the differences.

The use of UV absorbents is also beneficial while incorporating the cyclic process for the in-situ generation of chlorine dioxide. The cyclic process utilizes bromide ions that are activated by an oxidant such as chlorine or potassium monopersulfate to produce free bromine. The free bromine oxidizes chlorite ions producing chlorine dioxide. Chlorine dioxide inactivates microbiological organisms (i.e. *Cryptosporidium*). During this process the free bromine and at least some portion of the chlorine dioxide are reduced back to bromide ions and chlorite ions respectively which are recycled back to free bromine and chlorine dioxide utilizing the cyclic process. By inhibiting the UV degradation of chlorine dioxide and chlorite, the cyclic process can be carried out during daytime hours without rapid degradation of the chlorine dioxide and accelerated UV degradation of the chlorite. The cyclic process is therefore able to provide a continued and relatively consistent concentration of chlorine dioxide throughout the day.

Mixtures of UV absorbents can be blended together to provide the desired UV absorbance as well as desired features already disclosed. Suitable solvents can be selected for form solutions, slurries, emulsions and the like. The consistency and solubility is limited by the formulator. Depending on the UV absorbents solubility profile, non-limiting examples of solvents include: water, methanol, ethanol, isopropyl alcohol, acetone, DMSO, mineral oil and the like. Surfactants can be used to form emulsions. Examples of surfactants include ethoxylated alcohols, ethylene and propylene block copolymers and the like.

Non-limiting examples of UV absorbents include: Disodium Distyrylbiphenyl Disulfonate (DDBD), 2,4-dihydroxybenzophenone, 2,2',4,4'-tetrahydroxybenzophenone, 2-hydroxy-4-methoxybenzophenone, 5-benzoyl-4-hydroxy-2-methoxy monosodium salt, 5-methyl-2-(1-methyl-ethyl)-2-aminobenzoate, 2-Ethoxyethyl-para-methoxycinnamate, para-methoxyhydroxycinnamate, Amyl-4-methoxycinnamate, Amyl para-N,N-dimethylaminobenzoate, ethyl-4-bis(2-hydroxypropyl) aminobenzoate, 4,4'-Diamino-2,2'-stilbenedisulfonic acid, 4,4'-bis(benzoxazolyl)-cis-stilbene, 2,5-bis(benzoxazol-2-yl)thiophene, tetrasodium 4,4'-bis[[4-[bis(2-hydroxyethyl)amino]-6-(4sulphonatoanilino)-1,3,5-triazin-2-yl]amino]stilbene-2,2'-disulphonate] and the like. Preferred UV absorbents are low toxicity optical brighteners that undergo photo-degradation when exposed to UV. Non-limiting examples of suitable optical brighteners include: Disodium Distyrylbiphenyl Disulfonate (DDBD), tetrasodium 4,4'-bis[[4-[bis(2-hydroxyethyl)amino]-6-(4sulphonatoanilino)-1,3,5-triazin-2-yl]amino]stilbene-2,2'-disulphonate], 4,4'-diamino-2,2'-stilbenedisulfonic acid and 4,4'-Bis [4-[bis(2-hydroxyethyl)amino]-6-anilino-1,3,5-triazin-2-yl] amino]stilbene-2,2'-disulphonic acid.

Compositions of the invention comprise an aqueous solution of chlorite donor, borate donor and UV absorbent. It has been discovered that oxidizers like sodium chlorite can be safely combined with organic compounds like UV absorbents when an effective amount of borate donor is incorporated into the composition without concern of deflagration or detonation resulting from decomposition of the chlorite, even when the composition is dried.

The borate donor is added to achieve an effective weight percent (wt %) ratio to chlorite donor. The weight percent ratio of sodium chlorite (reported as $NaClO_2$) to hydrated borate donor (reported as the sum of $H_2O+B_2O_3$) is less than 1.5:1 respectfully. The sodium chlorite content of the composition can range from 1 to 25 wt % reported as $NaClO_2$.

Non-limiting examples of borate donors include: sodium tetraborate decahydrate, sodium tetraborate pentahydrate, disodium octaborate tetrahydrate, potassium pentaborate tetrahydrate, potassium tetraborate tetrahydrate, sodium metaborate dehydrate and sodium metaborate tetrahydrate. Preferred borate donors include sodium metaborate dehydrate and sodium metaborate tetrahydrate. The preferred borate donors are hydrates that buffer the pH above 9.0 and impart a stabilized source of water if/when the composition is dried to a crystallized form.

Sodium chlorite consumes 7-electrons when completely reduced during oxidation-reduction reactions. Compared to other oxyhalo compounds such as calcium hypochlorite that consumes 2-electrons, sodium chlorite is 3.5 times more efficient an oxidizer.

Without being bound to a specific theory, it is believed forming an aqueous solution of sodium chlorite and hydrated borate donor results in better distribution of the hydrated borate ($H_2O+B_2O_3$) throughout the crystals of sodium chlorite when the composition is dried. When nucleation and crystal formation occur during dewatering, the enhanced crystal matrix comprises combined crystals of hydrated borate and sodium chlorite crystals resulting in: isolating $NaClO_2$ from the fuel source, release of hydrated water thereby cooling any exothermic reaction and boric oxide functioning as a flame retardant. The optimum combination of hydrated water and boric oxide (also referred to as hydrated borate) are required to ensure dried compositions comprising organic compounds and/or when the composition contacts organic compounds then dries, the processes involved does not induce spontaneous combustion.

If wide spread use of sodium chlorite is to be achieved for the on-site or in-situ generation of chlorine dioxide, the composition must be sufficiently buffered to reduce the potential for release of chlorine dioxide in the event of contact with a contaminant that neutralizes the caustic used to stabilize sodium chlorite.

Addition of borate donor substantially increases the buffering capacity of the sodium chlorite. In the event the sodium chlorite contacts chemical residue from cleaners etc. the excess buffer will neutralize the acidity while maintaining the stability of the sodium chlorite.

With the addition of appropriate levels of hydrated borate donor to sodium chlorite, the resulting composition can be rendered safe for widespread use. The combined effects of reduced Division 5.1 classification as well as substantially increased buffering capacity provide for a composition with inherent safety built in.

Non-limiting examples of UV absorbents include: Disodium Distyrylbiphenyl Disulfonate (DDBD), 2,4-dihydroxybenzophenone, 2,2',4,4'-tetrahydroxybenzophenone, 2-hydroxy-4-methoxybenzophenone, 5-benzoyl-4-hydroxy-2-methoxy monosodium salt, 5-methyl-2-(1-methyl-ethyl)-2-aminobenzoate, 2-Ethoxyethyl-para-methoxycinnamate, para-methoxyhydroxycinnamate, Amyl-4-methoxycinnamate, Amyl para-N,N-dimethylaminobenzoate, ethyl-4-bis(2-hydroxypropyl) aminobenzoate, 4,4'-Diamino-2,2'-stilbenedisulfonic acid, 4 4'-bis(benzoxazolyl)-cis-stilbene, 2 5-bis(benzoxazol-2-yl)thiophene, tetrasodium 4,4'-bis[[4-[bis(2-hydroxyethyl)amino]-6-(4sulphonatoanilino)-1,3,5-triazin-2-yl]amino]stilbene-2,2'-disulphonate] and the like. Preferred UV absorbents are low toxicity optical brighteners that undergo photo-degradation when exposed to UV. Non-limiting examples of suitable optical brighteners include: Disodium Distyrylbiphenyl Disulfonate (DDBD), tetrasodium 4,4'-bis[[4-[bis(2-hydroxyethyl)amino]-6-(4sulphonatoanilino)-1,3,5-triazin-2-yl]amino]stilbene-2,2'-disulphonate], 4,4'-diamino-2,2'-stilbenedisulfonic acid and 4,4'-Bis[4-[bis(2-hydroxyethyl)amino]-6-anilino-1,3,5-triazin-2-yl]amino]stilbene-2,2'-disulphonic acid.

Non-limiting examples of hydrated borate donors include: sodium tetraborate decahydrate, sodium tetraborate pentahydrate, disodium octaborate tetrahydrate, potassium pentaborate tetrahydrate, potassium tetraborate tetrahydrate, sodium metaborate dehydrate and sodium metaborate tetrahydrate. Preferred borate donors include sodium metaborate dehydrate, sodium metaborate tetrahydrate and disodium octaborate tetrahydrate. The preferred borate donors buffer the pH above 10.5 and impart a stabilized source of water if/when the composition is dried to a crystallized form. Additional alkali can be added to disodium octaborate tetrahydrate to elevate the pH, or blends of hydrated borate donors to achieve the desired pH.

In addition to the hydrated borate donor, additional alkali such as sodium hydroxide and potassium hydroxide can be added to further elevate the pH in the event the borate donor buffers the pH below that required to stabilize the chlorite donor (i.e. approximately pH 10.5+). For example disodium octaborate tetrahydrate has a near neutral pH but provide excellent performance as a flame retardant. Addition of sodium hydroxide or potassium hydroxide to the borate solution raises the pH to enhance the stability of the sodium chlorite composition.

As used herein, the term "aquatic facility" is used with reference to all structural components and equipment comprising an aqueous system used by humans for exercise, sports and/or recreation. Examples of aquatic facilities include but are not limited to: residential swimming pools, water parks, theme parks, swimming pools, spas, therapy pools, hot tubs and the like.

As used herein, the term "aqueous system" describes a body of water that can be treated using the disclosed composition. Examples of aqueous systems include recreational water, cooling system exemplified by cooling towers and ponds, and waste water.

As used herein, the term "cooling system" is used to describe circulating systems and once thru systems that are used to remove heat from various industrial and energy processes. Cooling systems pump water thru heat exchanges to extract heat from the process. The heat is then dissipated by passing the heated water across a cooling tower where vaporization dissipates the heat by evaporation, or returning it to a heat sink such as a large body of water exemplified by a pond, river or lake.

As used herein, "recreational water" is water used by mammals (i.e. humans) for various activities such as swimming, exercise, water sports, recreation, physical therapy and diving. Examples of aqueous systems comprising recreational water include: swimming pools, hot tubs, feature pools, spas, water-park rides, therapy pools, diving wells etc.

As used herein, "aqueous solution" describes the liquid portion of the composition comprised of predominantly water wherein the sodium chlorite and borate donor dissolve or slurry.

As used herein, "hydrated borate donor" describes compounds that comprise hydrated water and boric oxide (reported as the sum of $H_2O+B_2O_3$). Non-limiting examples of hydrated borate donors include: sodium metaborate tetrahydrate, sodium metaborate dehydrate, potassium tetraborate tetrahydrate, sodium tetraborate decahydrate, disodium octaborate tetrahydrate, hydrated sodium calcium borate hydroxide, sodium tetraborate pentahydrate and the like. The weight percent (wt %) ratio of sodium chlorite (reported as $NaClO_2$) to hydrated borate donor (reported as the sum of $H_2O$ and $B_2O_3$) is less than 1.5:1, more preferred less than 1.25:1 and most preferred less than 1:1 respectively.

As used herein, "composition in dry form" describes a solid form of the composition comprising an aqueous solution of sodium chlorite (as $NaClO_2$) and hydrated borate donor (reported as the sum of $(H_2O+B_2O_3)$).

As used herein the term "Ct value" is defined as the product of the average concentration of an oxidant (mg/l) and time (minutes) of exposure to the oxidant. For example, if the average chlorine dioxide concentration of $ClO_2$ is determined to be 2.2 mg/l over a 20 minute period of time, the Ct value is calculated by multiplying the average concentration of chlorine dioxide by the time.

Ct value=2.2 mg/l>20 min

Ct value=44 min·mg/l

The Ct value can be targeted based on laboratory and/or field studies to achieve the desired level of inactivation. Comparatively, low Ct values (i.e. Ct=1 mg·min/l) may achieve a 6-log reduction in bacteria like *E. coli*, while higher Ct values (i.e. Ct=90 mg·min/l) may be required to reduce a parasite like *Cryptosporidium* by 3-log.

Figure 6:
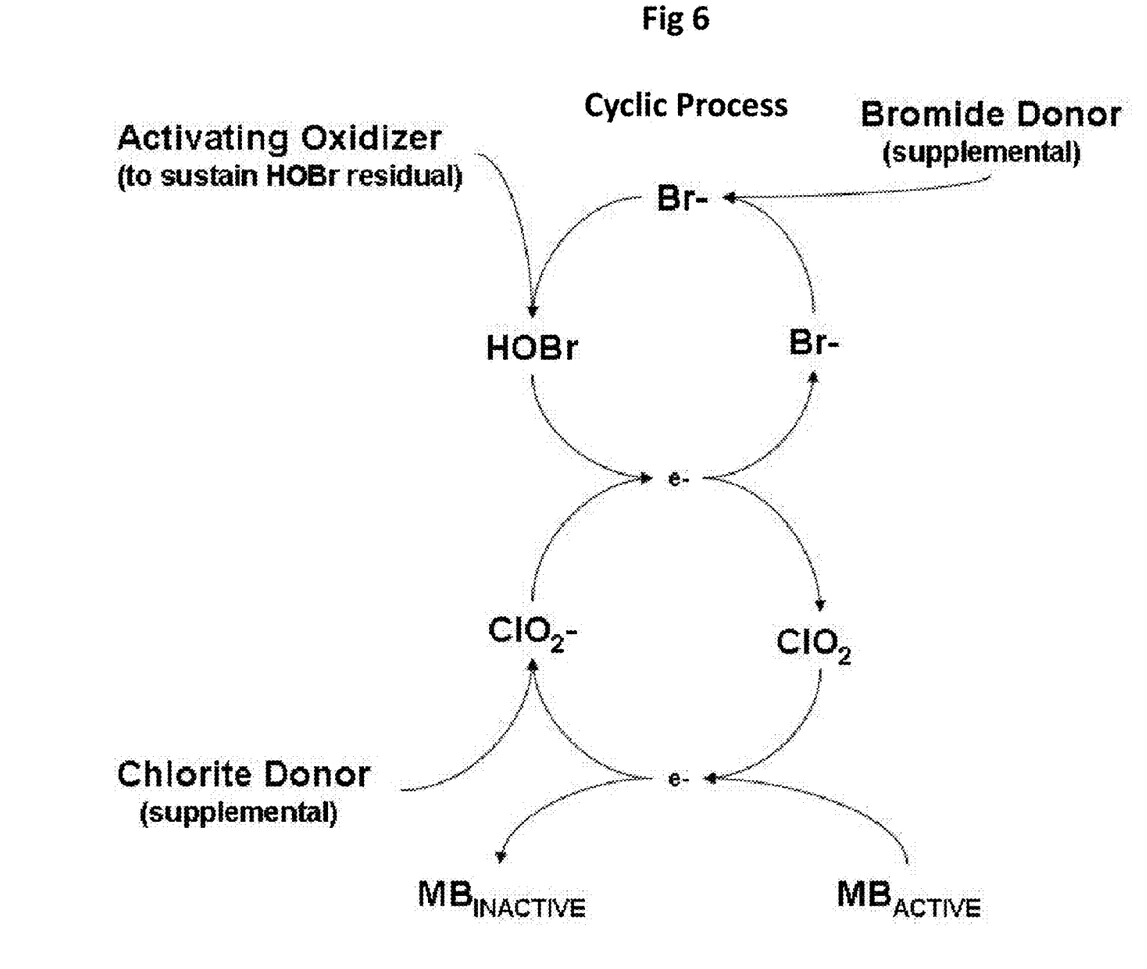
FIG. 6 illustrates the cyclic process.

As used herein, the term "cyclic process" relates to the recycling of substantially inert anions comprising bromide and chlorite into their oxyhalogen surrogates, exemplified by hypobromous acid and chlorine dioxide respectfully followed by reduction back to their respective anions, and where the process is repeated (FIG. 6).

As used herein, the term "chlorite anion donor" and "chlorite donor" is a compound that comprises an alkali metal salt comprising chlorite anions $ClO_2^-$, chlorine dioxide, or any convenient direct or indirect source of chlorite anions. For example, chlorine dioxide can indirectly produce chlorite due to reduction in an aqueous system. Sodium chlorite directly supplies chlorite anions.

As used herein, the term "chlorite anion" (also referred to as "chlorite") comprises chlorite having the general formula $ClO_2^-$. The chlorite is the anion released when sodium chlorite is dissolved in water and converts to chlorine dioxide.

As used herein, the term "recycled" means at least some portion of the recovered bromide anions and chlorite anions are regenerated to their respective oxyhalogen compounds, followed by reduction back to their respective anions, and where the process is repeated.

As used herein, the term "*Cryptosporidium*" is used to represent any form of parasitic microbiological organism from the family of *Cryptosporidium*. An example of *Cryptosporidium* is *Cryptosporidium parvum* (also referred to as *C. parvum, C. parvum* and *Cryptosporidium parvum*). Other examples of *Cryptosporidium* include but are not limited to: *C. hominis, C. canis, C. felis, C. meleagridis*, and *C. muris*. It is to be noted that inclusion or exclusion of italic characters or print when referring to *Cryptosporidium* or any of its many variants does not in any way detract from its intended descriptive meaning.

As used herein, the term "microbiological organisms" is used with reference to all forms of microbiological life including: parasites, bacteria, viruses, algae, fungus, and organisms encased in biofilms.

As used herein, "parasites" includes any species of organism including *Cryptosporidium, Giardia* and Ameba that can be transferred to humans by water and cause waterborne parasitic disease in humans.

As used herein, the term "inactivation" is used with reference to the ability to deactivate, kill, or destroy microbiological organisms.

As used herein, "remediation" is defined as the ability to reduce the level of waterborne pathogens and/or algae to levels below that deemed acceptable for a specific application. Acceptable levels are established by various agencies exemplified by State and local Departments of Health, U.S. Environmental Protection Agency, and/or the Centers for Disease Control and Prevention. Examples of remediation for specific applications and waterborne pathogens are exemplified.

In the water of a cooling system, remediation reduces *legionella* bacteria to less than 1 CFU per ml.

In recreational water, at least one of the following is achieved: less than 1 CFU per ml detection using heterotrophic plate count; greater than or equal to a 3-log reduction of parasites, and/or rendering the aqueous system free of algae.

As used herein, "Heterotrophic plate count (HPC) is also known by a number of other names, including standard plate count, total plate count, total viable count or aerobic quality count. It does not differentiate between the types of bacteria present nor does it indicate the total number of bacteria present in the water—only those capable of forming visible colonies under specified conditions on certain non-selective microbiological media. Varying the incubation temperature will favor the growth of different groups of bacteria. As it gives more meaningful information about pathogenic (disease-causing) bacteria, 35° C. (or 37° C.) is the preferred incubation temperature. HPC does not necessarily indicate microbiological safety as the bacteria isolated may not have been fecally-derived but it does give a measure of the overall general quality of the pool water, and whether the filtration and disinfection systems are operating satisfactorily. Results reported by the laboratory are traditionally expressed as colony forming units per milliliter (CFU/mL) which equates to the number of bacteria in each milliliter of the original sample of water. A HPC count of less than1 CFU/mL indicates that the disinfection system is effective. If the count is between 10 and 100 CFU/mL, a routine investigation should be conducted as soon as possible to ensure that all the management operations are functioning properly.

As used herein, "CFU" (Colony Forming Units) is a unit used in microbiology to estimate the number of viable bacteria or fungal cells in a sample.

Figure 1:
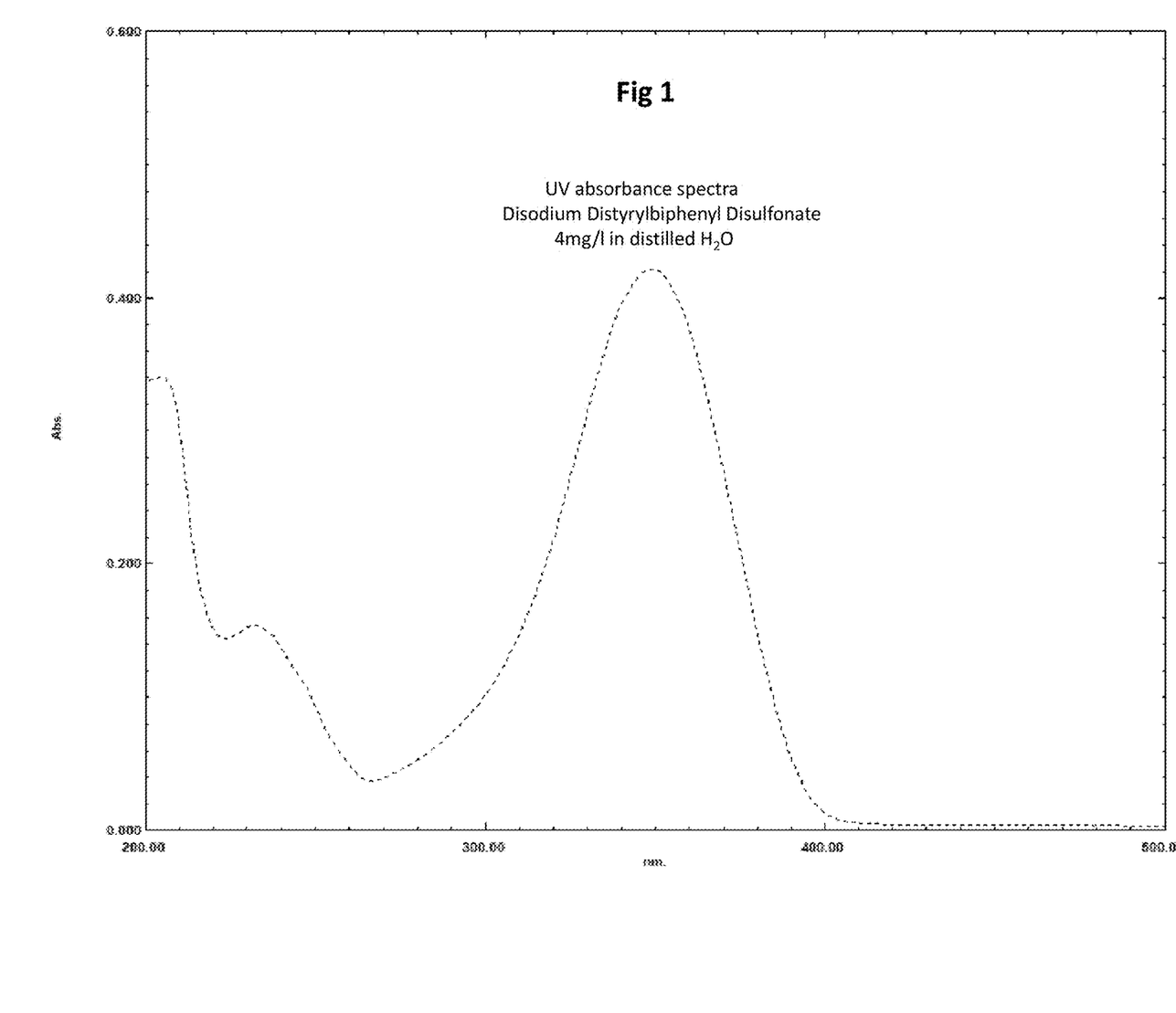
FIG. 1 shows the UV absorbance spectra of Disodium Distyrylbiphenyl Disulfonate (DDBD) at a concentration of 4 mg/l in distilled $H_2O$.
Figure 2:
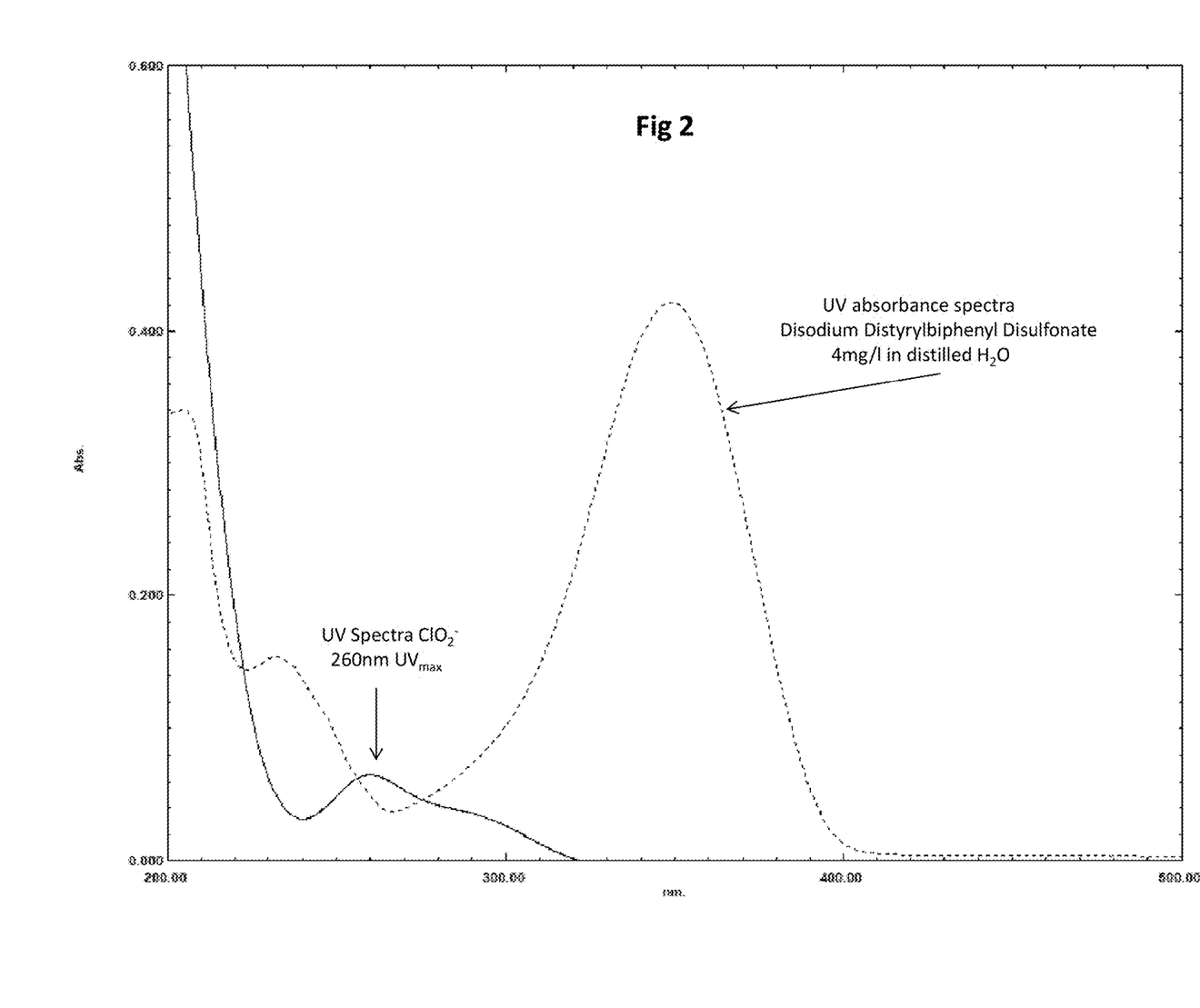
FIG. 2 illustrates how the UV spectra of chlorite anion overlays that of UV absorbent DDBD. The chlorite anion is provided virtually no UV protection.
Figure 3:
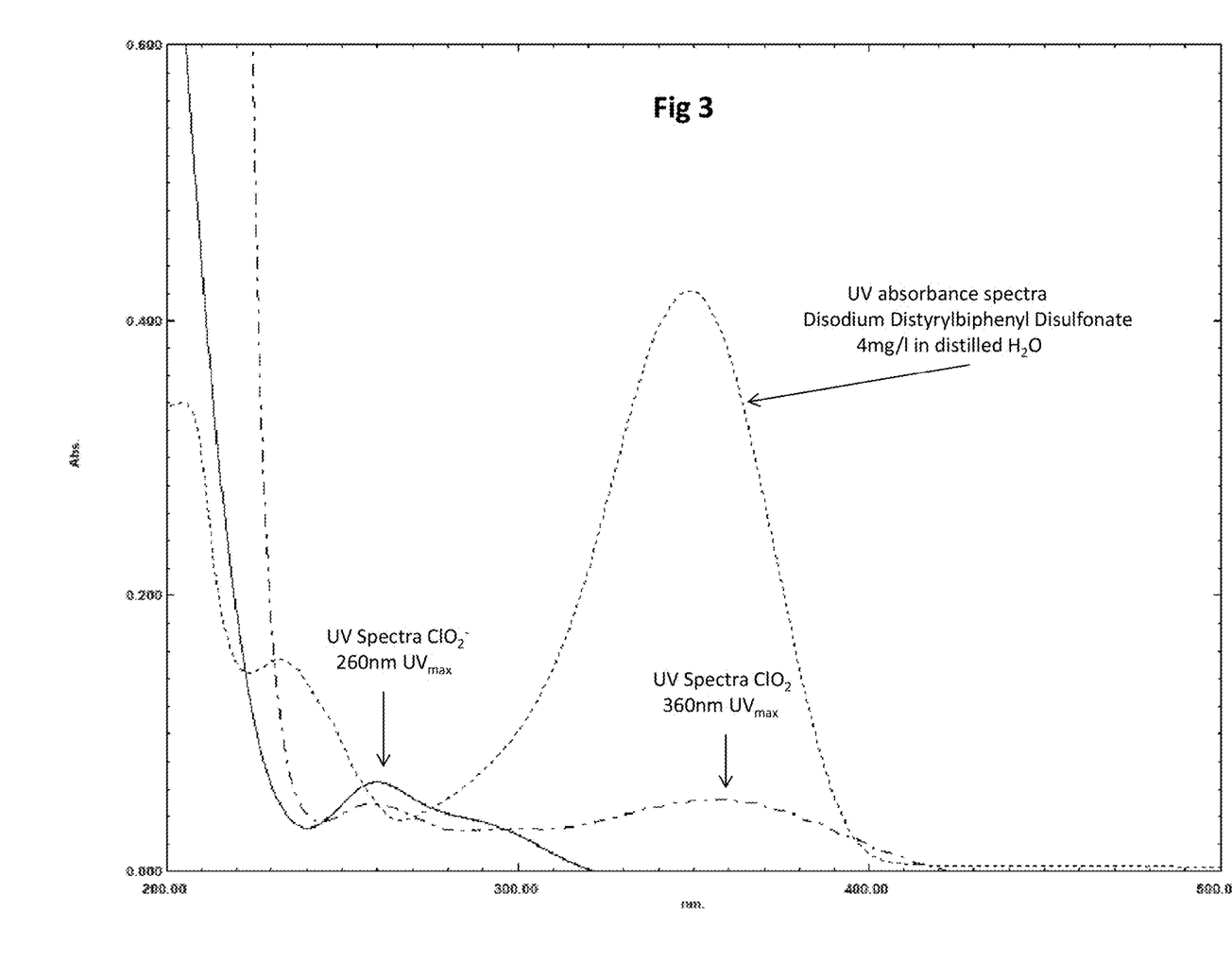
FIG. 3 illustrates the presence of chlorine dioxide with $UV_{max}$ at 360 nm wavelength. The overwhelming portion of the $ClO_2$ UV spectra is covered by the dome of UV protection provided by the DDBD.
Figure 4:
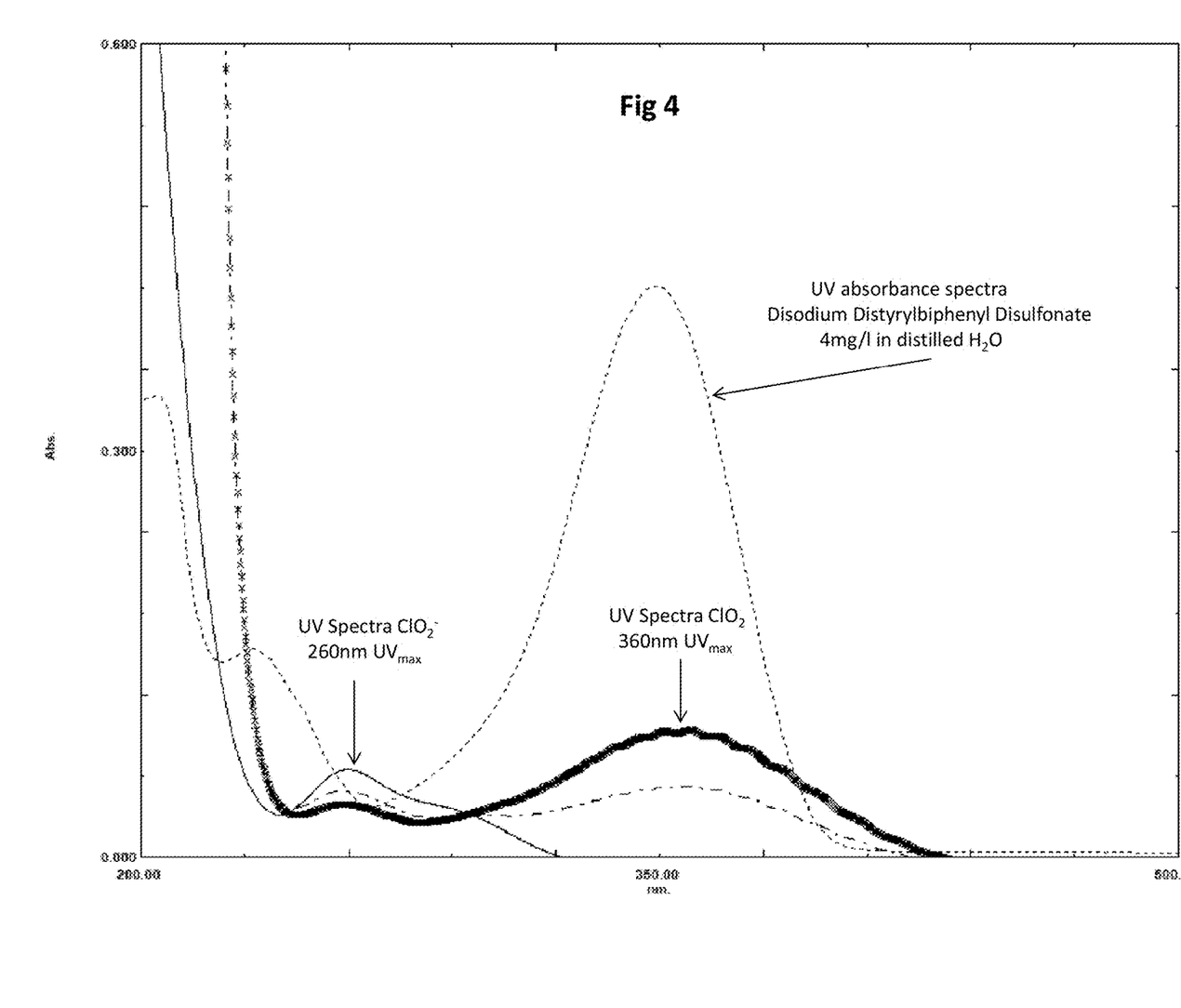
FIG. 4 shows the increasing concentration of chlorine dioxide resulting from the cyclic process which remains protected by the dome of UV absorbent DDBD.
Figure 5:
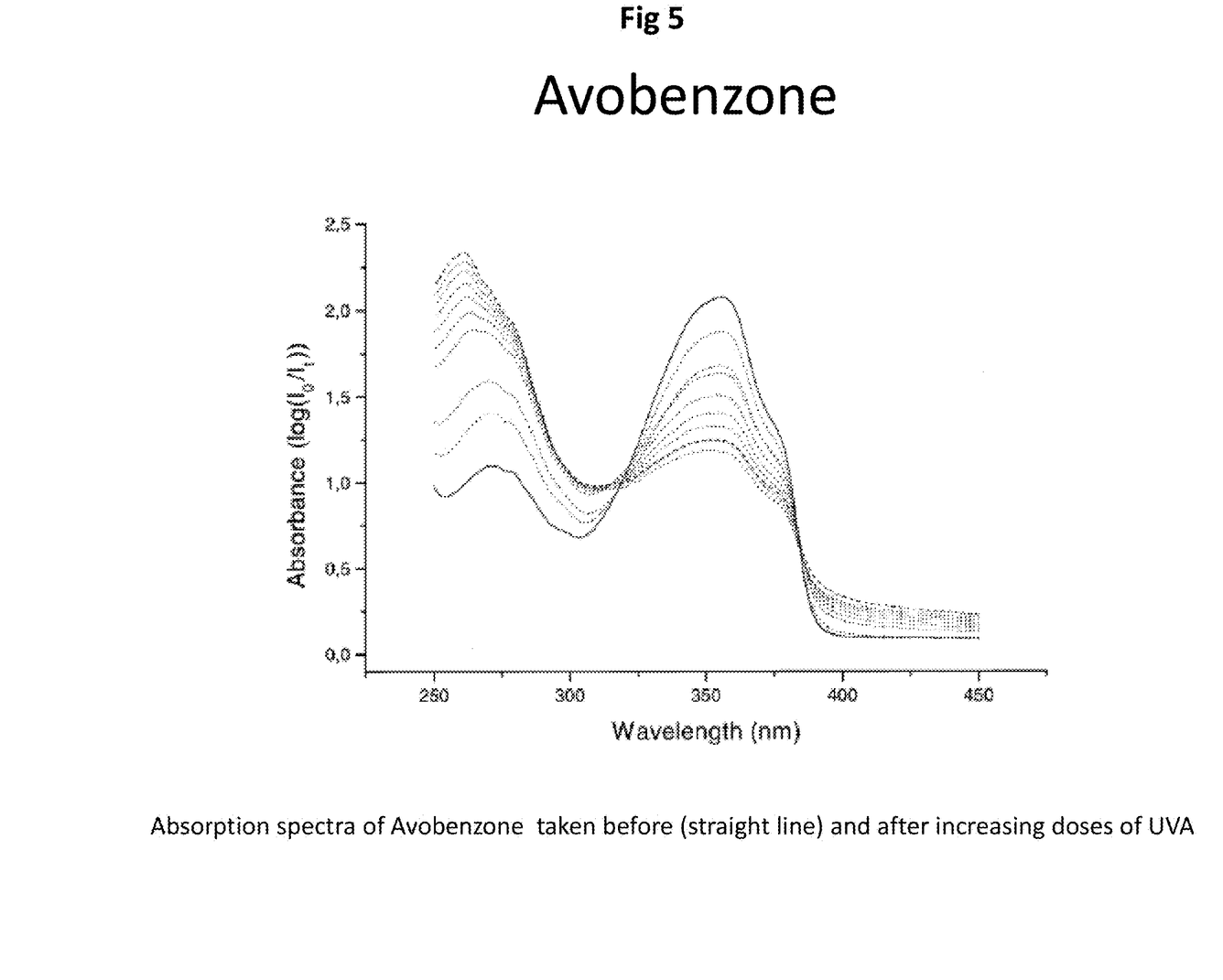
FIG. 5 illustrates the UV spectra of Avobenzone that effectively protects both the chlorite anion $UV_{max}$ of 260 nm as well as the chlorine dioxide $UV_{max}$ at 360 nm.

As used herein "UV absorbent" describes chromophores capable of absorbing UV in the wavelengths that include at least some portion of the chlorine dioxide UV spectrum. The UV absorbent absorbs ultraviolet radiation in the range of wavelengths that include greater than 25%, preferably greater than 50% and most preferably greater than 75% of the chlorine dioxide UV absorbance spectrum. Referring to FIGS. 3 and 4, the UV absorbance spectrum of DDBD clearly encompasses the majority of chlorine dioxide UV absorbance spectrum.

As used herein "effective amount of UV absorbent" is the concentration of UV absorbent needed to sufficiently inhibit UV degradation (also referred to as photo-degradation) of chlorine dioxide in order to achieve remediation.

As used herein, "non-combustible" describes the dried composition when tested in accordance with the UN Manual of Tests and Criteria [49 CFR § 173.127(b)] is classified as a non-Division 5.1.

As used herein, "chlorine dioxide generator" defines any system or device that can activate an aqueous solution of sodium chlorite to produce an aqueous solution of chlorine dioxide. The system or device provides for the ex-situ generation of chlorine dioxide that is then applied to the aqueous system.

Code of Federal Regulations, Title 49, and the United Nations Transport of Dangerous Goods-Manual of Tests and Criteria, Fifth revised edition (2009), describes the methods for testing and determining the classification of solid materials as oxidizers (Division 5.1 materials).

In accordance with regulations of the US Department of Transportation, 49 CFR § 173.127(a), an "oxidizer" (Division 5.1) is defined as a material that may, generally by yielding oxygen, cause or enhance the combustion of other materials. A solid material is classed as a Division 5.1 material if, when tested in accordance with the UN Manual of Tests and Criteria, blends of it with cellulose have mean burning times less than or equal to the burning time of a 3:7 potassium bromate-cellulose mixture [49 CFR § 173.127(a)(1)].

Solid Division 5.1 materials are assigned packing groups using the following criteria [49 CFR § 173.127(b)]:

(i) Packing Group I is the sub-classification of any material which, in the 4:1 or 1:1 sample to cellulose ratio (by mass) tested exhibits a mean burning time less than the mean burning time of a 3:2 mixture, by mass, of potassium bromate and cellulose.

(ii) Packing Group II is the sub-classification of any material which, in the 4:1 or 1:1 sample to cellulose ratio (by mass) tested exhibits a mean burning time less than the mean burning time of a 2:3 mixture, by mass, of potassium bromate and cellulose, and the criteria for Packing Group I are not met.

(iii) Packing Group III is the sub-classification of any material which, in the 4:1 or 1:1 sample to cellulose ratio (by mass) tested exhibits a mean burning time less than the mean burning time of a 3:7 mixture, by mass, of potassium bromate and cellulose, and the criteria for Packing Groups I and II are not met.

A non-Division 5.1 material is a material which, in the 4:1 or 1:1 sample to cellulose ratio (by mass) tested, does not ignite and burn, or exhibits a mean burning time greater than that of a 3:7 mixture, by mass, of potassium bromate and cellulose.

EXAMPLES

Sample #1

Using a heating magnetic stirrer, 2000 ml beaker and stirring rod 600 g of Technical Solution 31.25 wt % sodium chlorite (comprises 25 wt % as $NaClO_2$) obtained from OxyChem was blended with 150 g of sodium metaborate 4 mol obtained from Rio Tinto. The solution was heated to 40° C.-45° C. and mixed until the hydrated borate was dissolved. The heated solution was mixed to sustain a large vortex. A fan was used to direct air across the surface of the beaker to assist in evaporating the water. The solution was heated and mixed until a thick slurry formed and very little vortex remained. The slurry was poured onto a stainless steel tray lined with a thick plastic liner and in a desiccating chamber to dry for 3 days.

The sheet of dried composition was broken into pieces, then ground to form a fine powder that passed thru a 500 µm sieve. The powder was stored in a Nalgene bottle to form Sample #1.

Sample #2

Using a heating magnetic stirrer, 2000 ml beaker and stirring rod 500 g of Technical Solution 31.25 wt % sodium chlorite (comprises 25 wt % as $NaClO_2$) obtained from OxyChem was blended with 187.5 g of sodium metaborate 4 mol obtained from Rio Tinto. Additionally 237.5 g distilled water was added. The solution was heated to 40° C.-45° C. and mixed until the hydrated borate was dissolved. The heated solution was mixed to sustain a large vortex. A fan was used to direct air across the surface of the beaker to assist in evaporating the water. The solution was heated and mixed until a thick slurry formed and very little vortex remained. The slurry was poured onto a stainless steel tray lined with a thick plastic liner and in a desiccating chamber to dry for 5 days.

The sheet of dried composition was broken then ground to form a fine powder that passed thru a 500 µm sieve. The powder was stored in a Nalgene bottle to form Sample #2.

The samples were sent to Stresau Laboratory located in Spooner, Wis. for Division 5.1 Solid Oxidizer Analysis. Sample #1 was designated "20028-1" and Sample #2 was designated "20028-2".

Discussion for Samples #1 and #2:

The wt % ratio of sodium chlorite (reported as $NaClO_2$) to hydrated borate (reported as the sum of $B_2O_3+H_2O$) for each dried sample was determined as follows.

The hydrated borate obtained from Rio Tinto comprises 34.18 wt % as $B_2O_3$ and 35.39 wt % as $H_2O$.

Sample #1 comprised 150 g as $NaClO_2$ and 150 g (hydrate borate)×0.6957 (% as $B_2O_3+H_2O$)

$$\text{Wt \% Ratio} = 150 \text{ g (as } NaClO_2) \div 104.36 \text{ g (as } B_2O_3 + H_2O)$$
$$= 1.44 \text{ (as } NaClO_2) \text{ to } 1.00 \text{ (as } B_2O_3 + H_2O)$$

Sample #2 comprised 125 g as $NaClO_2$ and 187.5 g (hydrate borate)×0.6957 (% as $B_2O_3+H_2O$)

$$\text{Wt \% Ratio} = 125 \text{ g (as } NaClO_2 = 130.44 \text{ g } B_2O_3 + H_2O$$
$$= 0.96 \text{ (as } NaClO_2) \text{ to } 1.00 \text{ (as } B_2O_3 + H_2O)$$

Figure 7:
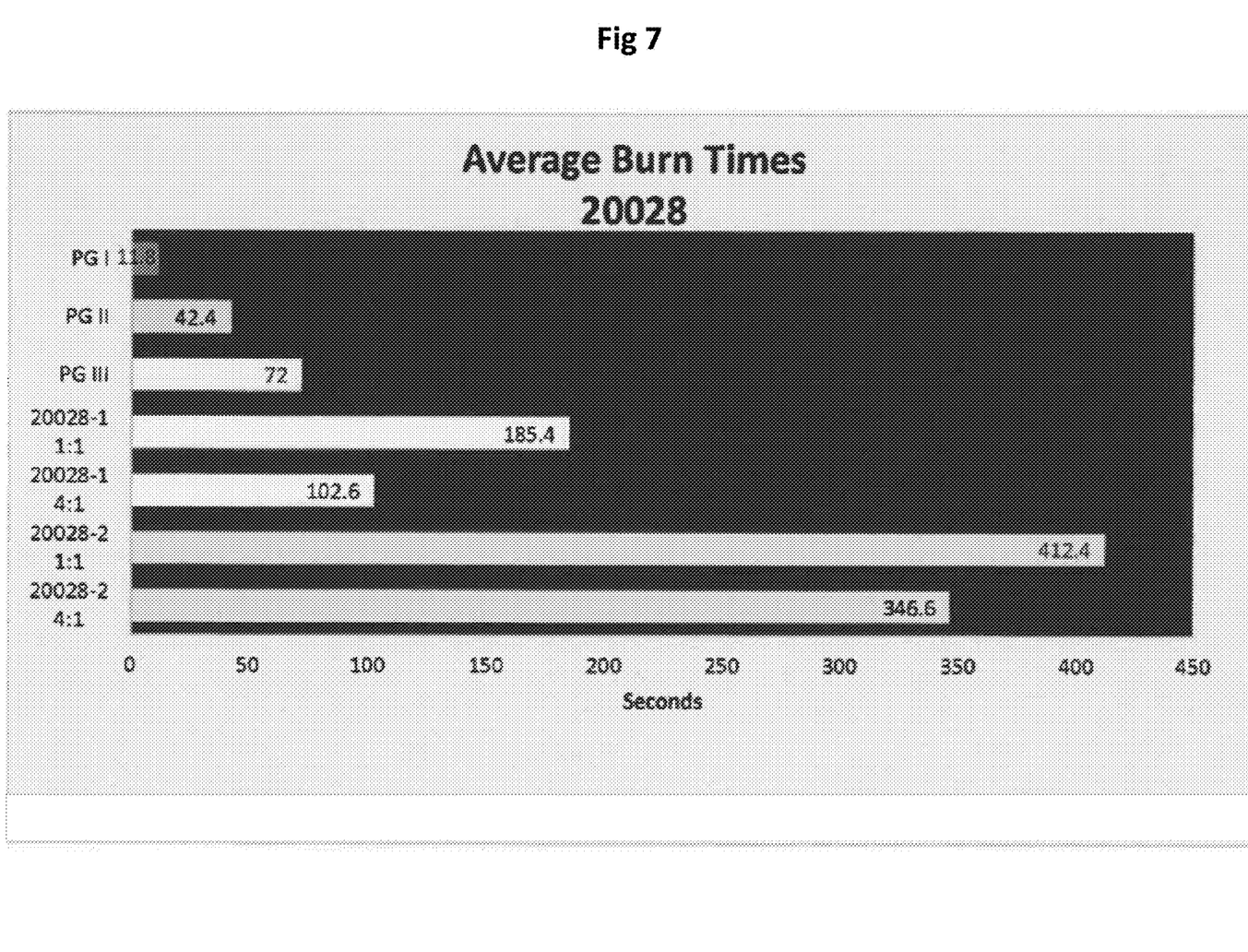
FIG. 7 shows the average burn rates compared to the standards for packaging groups (PG) I, II, and III to the burn rates of both samples 20028-1 and 20028-2. The results clearly illustrate that both samples were classified as Non-Divisional 5.1.

Results for Samples #1 and #2:

FIG. 7 shows the average burn rates compared to the standards for packaging groups (PG) I, II, and III to the burn rates of both samples 20028-1 and 20028-2. The results clearly illustrate that both samples were classified as Non-Divisional 5.1.

UV Activated Remediation

To 49 grams distilled water 1 gram of tetrasodium 4,4'-bis[[4-[bis(2-hydroxyethyl)amino]-6-(4sulphonatoanilino)-1,3,5-triazin-2-yl]amino]stilbene-2,2'-disulphonate] was added and mixed until dissolved. Then 10 grams of sodium metaborate tetrahydrate was added mixed until dissolved. To the clear yellow solution, 40 grams of 25 wt % sodium chlorite was added and allowed to mix for 10 minutes to form a composition.

2000 ml of tap water (pH~7.9) was added to a glass beaker into which 10 µl of composition (equivalent to 0.37 ppm as $ClO_2^-$) was added and thoroughly mixed. The beaker was placed in direct sunlight. After 70 minutes and 240 minutes samples were taken and tested for chlorine dioxide using a low range lissamine green test kit from Palin Test. The test results were 0.34 ppm as $ClO_2$ after 70 minutes and 0.25 ppm $ClO_2$ after 240 minutes.

Calculating the Ct Value:

$ClO_2$ concentration at Time=0 min (0 mg/l)
$ClO_2$ concentration at Time=70 min (0.34 mg/l)
$ClO_2$ concentration at Time=240 min (0.25 mg/l)
Calculate average $ClO_2$ concentration at Time=70 min (0 mg/l+0.34 mg/l)÷2=0.17 mg/l
Calculate average $ClO_2$ concentration between Time=70 min & 240 min (170 min lapsed time)

$$(0.34 \text{ mg/l} + 0.25 \text{ mg/l}) \div 2 = 0.295 \text{ mg/l}$$

$$\text{Calculated } Ct \text{ Value} = (0.17 \text{ mg/l} \times 70 \text{ min}) +$$
$$(0.295 \text{ mg/l} \times 170 \text{ min})$$
$$= 11.9 \text{ (min} \times \text{mg/l)} + 50.15 \text{ (min} \times \text{mg/l)}$$
$$= 62.05 \text{ (min} \times \text{mg/l)}$$

It is to be understood that the foregoing illustrative embodiments have been provided merely for the purpose of explanation and are in no way to be construed as limiting of the invention. Words used herein are words of description and illustration, rather than words of limitation. In addition, the advantages and objectives described herein may not be realized by each and every embodiment practicing the present invention. Further, although the invention has been described herein with reference to particular structure, steps and/or embodiments, the invention is not intended to be limited to the particulars disclosed herein. Rather, the invention extends to all functionally equivalent structures, processes and uses, such as are within the scope of the appended claims. Those skilled in the art, having the benefit of the teachings of this specification, may affect numerous modifications thereto and changes may be made without departing from the scope and spirit of the invention.

The invention claimed is:

1. A method for the remediation of an aqueous system, the method comprising:
   converting a composition into an aqueous solution of chlorine dioxide using a chlorine dioxide generator, wherein the composition is formed from water, sodium chlorite and a hydrated borate donor, the composition having a pH of greater than 9.0, and the weight percent ratio of sodium chlorite ($NaClO_2$) to hydrated borate donor ($H_2O+B_2O_3$) is less than 1.5:1 respectfully;
   applying the aqueous solution of chlorine dioxide to the aqueous system; and
   sustaining a chlorine dioxide concentration to obtain a Ct value sufficient to achieve remediation, wherein the Ct value is calculated by multiplying the average concentration of chlorine dioxide by the time.

2. The method according to claim 1, further comprising sustaining the concentration of chlorine dioxide using a cyclic process.

3. The method according to claim 1, further comprising sustaining the chlorine dioxide concentration using UV activation of chlorite.

4. The method according to claim 1, wherein the composition in dry form is classified as non-divisional 5.1.

5. The composition according to claim 1, wherein the weight percent ratio of sodium chlorite to hydrated borate donor based on the composition is less than 1.25:1.

6. The composition according to claim 1, wherein the weight percent ratio of sodium chlorite to hydrated borate donor based on the composition is less than 1:1.

7. The composition according to claim 1, further comprising a UV absorbent.

8. The method according to claim 1, wherein remediation achieves less than 1 CFU per ml detection using heterotrophic plate count.

9. The method according to claim 1, wherein remediation achieves greater than or equal to 3-log reduction of parasite.

10. The method according to claim 9, wherein the parasite comprises *Cryptosporidium*.

11. The method according to claim 9, wherein the parasite comprises Giardia.

12. The method according to claim 9, wherein the parasite comprises Ameba.

13. The method according to claim 1, wherein remediation renders the aqueous system free of algae.

14. The composition according to claim 1, wherein the pH is greater than 10.0.

15. The composition according to claim 14, wherein the pH is greater than 11.0.

16. The method according to claim 1, wherein the aqueous system comprises recreational water.

17. A method for the remediation of an aqueous system, the method comprising:
  applying a composition to the aqueous system, wherein the composition is formed from water, sodium chlorite, and a hydrated borate donor, the composition having a pH of greater than 9.0, and the weight percent ratio of sodium chlorite ($NaClO_2$) to hydrated borate donor ($H_2O+B_2O_3$) is less than 1.5:1 respectfully;
  converting the chlorite into chlorine dioxide using a cyclic process and/or UV activation of chlorite; and
  sustaining a chlorine dioxide concentration to obtain a Ct value sufficient to achieve remediation, wherein the Ct value is calculated by multiplying the average concentration of chlorine dioxide by the time.

18. The method according to claim 17, wherein the composition in dry form is classified as non-divisional 5.1.

19. The composition according to claim 17, wherein the weight percent ratio of sodium chlorite to hydrated borate donor based on the composition is less than 1.25:1.

20. The composition according to claim 17, wherein the weight percent ratio of sodium chlorite to hydrated borate donor based on the composition is less than 1:1.

21. The composition according to claim 17, further comprising a UV absorbent.

22. The method according to claim 17, wherein remediation achieves less than 1 CFU per ml detection using heterotrophic plate count.

23. The method according to claim 17, wherein remediation achieves greater than or equal to 3-log reduction of parasite.

24. The method according to claim 23, wherein the parasite comprises *Cryptosporidium*.

25. The method according to claim 23, wherein the parasite comprises Giardia.

26. The method according to claim 23, wherein the parasite comprises Ameba.

27. The method according to claim 17, wherein remediation renders the aqueous system free of algae.

28. The composition according to claim 17, wherein the pH is greater than 10.0.

29. The composition according to claim 28, wherein the pH is greater than 11.0.

30. The method according to claim 17, wherein the aqueous system comprises recreational water.

31. The method according to claim 17, wherein the aqueous systems comprises an aquatic facility.

32. The method according to claim 17, wherein the aqueous system comprises a cooling system.

33. The method according to claim 32, wherein remediation reduces *legionella* bacteria to less than 1 CFU per ml.

34. A stabilized aqueous sodium chlorite composition formed from:
  water;
  sodium chlorite; and
  a hydrated borate donor, wherein the composition having a pH of greater than 9.0, and the weight percent ratio of sodium chlorite ($NaClO_2$) to hydrated borate donor ($H_2O+B_2O_3$) is less than 1.5:1 respectfully.

35. The stabilized sodium chlorite composition according to claim 34, further comprising a UV absorbent.

36. The stabilized sodium chlorite composition according to claim 35, wherein the composition has been dried to be in a solid, dry form.

* * * * *